(12) United States Patent
Kuroda et al.

(10) Patent No.: US 6,530,524 B1
(45) Date of Patent: Mar. 11, 2003

(54) PORTABLE ELECTRONIC APPARATUS HAVING A SCANNER AND A DATA TRANSMITTER

(75) Inventors: Kazuo Kuroda, Saitama (JP); Mitsuhiro Watanabe, Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/489,472

(22) Filed: Jan. 21, 2000

(30) Foreign Application Priority Data

Jan. 22, 1999 (JP) .......................................... 11-014306

(51) Int. Cl.⁷ ................................................. G06K 7/10
(52) U.S. Cl. .............................. 235/462.2; 235/462.25; 235/470
(58) Field of Search .................... 235/462.2, 462.01, 235/462.25, 462.45, 470, 472.01

(56) References Cited

U.S. PATENT DOCUMENTS

| | | | | |
|---|---|---|---|---|
| 3,646,323 A | * | 2/1972 | Young et al. | ............... 235/476 |
| 3,885,870 A | * | 5/1975 | Levy et al. | ................... 355/14 |
| 4,959,688 A | * | 9/1990 | Koitabashi | .................. 355/219 |
| 5,850,077 A | * | 12/1998 | Tognazzini | .................. 235/380 |
| 6,102,293 A | * | 8/2000 | Karkan et al. | ........... 235/462.3 |
| 6,260,760 B1 | * | 7/2001 | Knighton et al. | ........... 235/454 |

FOREIGN PATENT DOCUMENTS

| | | | | |
|---|---|---|---|---|
| EP | 0687990 | * | 12/1995 | .......... G06K/13/08 |
| JP | 8-161089 | | 6/1996 | |

* cited by examiner

Primary Examiner—Michael G. Lee
Assistant Examiner—Daniel St. Cyr
(74) Attorney, Agent, or Firm—Morgan, Lewis & Bockius LLP

(57) ABSTRACT

A portable electronic apparatus includes a light source; memory circuitry that stores data; optical scanning circuitry that uses the light source to optically scan an image and to generate data corresponding to the image to be stored in the memory circuitry; an optical transmitter using the light source to optically transmit data in the memory circuitry; a selector connected with the light source to provide one of a first input signal modulated according to the data stored in the memory circuitry and a second input signal that is constant, and a controller that controls the selector to supply the second signal to the light source when a scanning mode is selected and to supply the first signal to the light source when a data transmission mode is selected.

9 Claims, 4 Drawing Sheets

PORTABLE ELECTRONIC APPARATUS HAVING A SCANNER AND A DATA TRANSMITTER

This application claims the benefit of Japanese Patent Application No. 11-014306, filed Jan. 22, 1999, which is hereby incorporated by reference.

BACKGROUND OF THE INVENTION

1. Field of the Invention

This invention relates to a portable electronic apparatus including a scanner and a data transmitter, and more particularly, to a palm-size PC (or an organizer) including an image scanner and a data transmitter.

2. Discussion of the Related Art

Portable electronic apparatuses has been achieved through the result of technological advances in areas such as display devices, batteries, and memory devices. For example, electronic devices now have lower electrical consumption, smaller batteries, and smaller memories with larger capacities.

As a result, an organizer is possible having a database to store massive amounts of data and a processor to efficiently search the data. If the organizer further has an optical communication system, a user can transfer the data to be used on a more functional apparatus such as a personal computer (hereinafter referred as PC) by transferring the data via the optical communication system. In addition, the user can obtain other data through the optical communication system. For example, data can be read by an image scanner that is connected to the PC, transferred to the organizer through the optical communication, and stored in the organizer. If necessary, the data can be converted into character data before being stored.

Generally, such palm-size PCs or organizers can be used at remote locations due to their small size and transportability. In remote operation, the device is usually manually operated. For instance, when inputting information from a business card, the user must manually enter a company name and a telephone number. However, manual operations are complicated.

The use of an optional image scanner and optical communication avoids such complications. However, since the optional image scanner is separate from the hand-held apparatus, the use of two separate apparatuses is also complicated. Even if the two apparatuses are simply combined, the resulting apparatus is still inefficient.

SUMMARY OF THE INVENTION

Accordingly, the present invention is directed to a portable electronic apparatus that substantially obviates one or more of the problems due to limitations and disadvantages of the related art.

An object of the present invention is to provide a portable apparatus efficiently integrating an image scanner and a data transmitter.

Additional features and advantages of the invention will be set forth in the description that follows, and in part will be appeared from the description, or may be learned by the practice of the invention. The objectives and other advantages of the invention will be realized and attained by the structure particularly pointed out in the written description and claims hereof with the appended drawings.

To achieve these and other advantages and in accordance with the purpose of the present inventions, as embodied and broadly described, a portable electronic apparatus includes a light source, a memory circuitry that stores data an optical scanning circuitry that uses the light source to optically scan an image and to generate data corresponding to the image to be stored in the memory circuitry, an optical transmitter using the light source to optically transmit data in the memory circuitry; a selector connected with the light source to provide one of a first input signal modulated according to the data stored in the memory circuitry and a second input signal that is constant; and a controller that controls the selector to supply the second signal to the light source when a scanning mode is selected and to supply the first signal to the light source when a data transmission mode is selected.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and constitute a part of this specification, illustrate an embodiment of the invention and serve to explain the principle of the invention together with the description. In the drawings.

DETAILED DESCRIPTION OF THE PREFERRED EMBODIMENT

Reference will now be made in detail to the preferred embodiment of the present invention, an example of which is illustrated in the accompanying drawings.

Figure 1A:
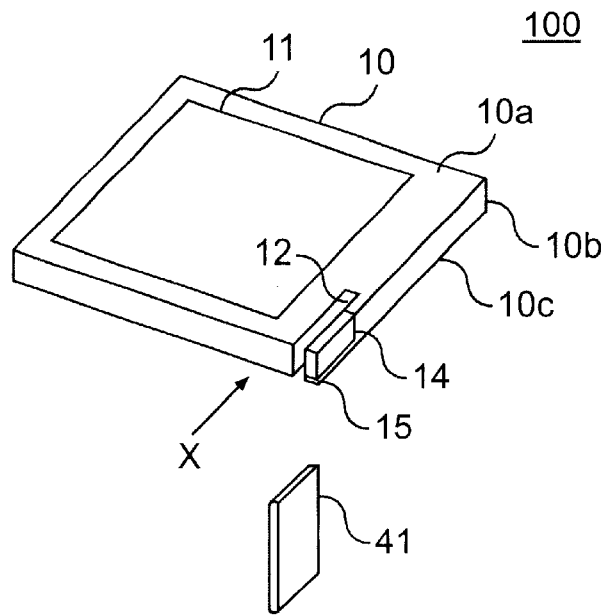
FIGS. 1A and 1B are diagrams showing the structure of a portable electronic according to an embodiment of the present invention.
Figure 1B:
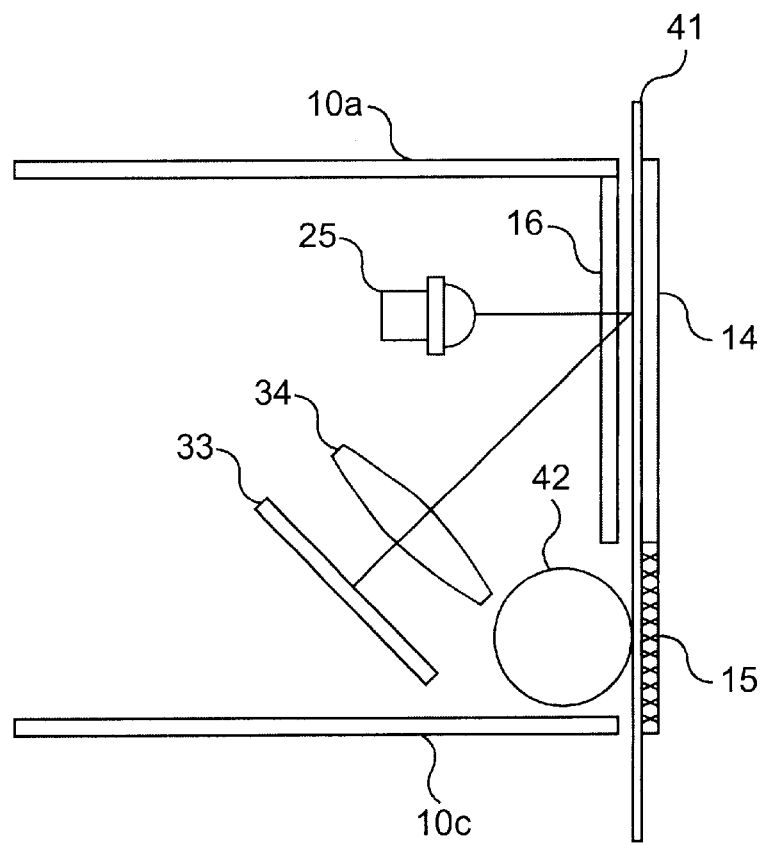

FIGS. 1A and 1B are a structural diagram of an organizer 100 which is an example of a portable apparatus according to the present invention. FIG. 1A shows an exterior perspective view of the organizer 100 and FIG. 1B shows internal structural view from point X of FIG. 1A. Of course, the device of FIGS. 1A and 1B is not limited to the illustrated components and may include additional components.

The organizer 100 comprises a display 11 disposed on a central portion of a top board 10a of a case 10; a slit 12 functioning as an opening to receive an image (i.e., a subject or object bearing an image) 41 to be scanned; an infrared passing filter 14; a conductive pad 15; a transparent glass 16; a roller 42 that is elastic and conductive. As shown in FIG. 1B, the filter 14 and the conductive pad 15 occupy a part of the sidewall 10b. The conductive pad 15 is adjacent to the filter 14. The transparent glass 16, which defines an inner wall of the slit 12, is disposed opposite the filter 14. The roller 42 is disposed opposite the conductive pad 15. A pushing means (not shown) biases the roller 42 toward the conductive pad 15. Thus, when the image 41 is not inserted into the opening of the organizer 100, the conductive pad 15 contacts the roller 42.

A light source 25, a condensing lens 34, and a line sensor 33 are disposed in the case 10. The light source 25 is common light source for data transmission and data scanning. In the Data Transmission Mode, light from the light source 25 is used as a carrier signal modulated by the transmitted data. The modulated light passes through the transparent glass 16. Then, the infrared portion of the modulated light passes through the filter 14 toward a receiving apparatus having an infrared receiver, such as a conventional PC. In the Scanning Mode, light source 25 is used as a scanning light source to read an image inserted into the opening. Here, the light from the light source 25 passes through the transparent glass 16 to the surface of the image 41 inserted into the slit 12. Then, the light is reflected by the image 41 and is concentrated on the line sensor 33 via the condensing lens 34.

The image 41 is inserted from the bottom side of the organizer 100. When the image 41 is inserted through the opening 12, the image is pushed into contact with both the roller 42 and the conductive pad 15. Then, image 41 moves between the roller 42 and the conductive pad 15, thereby pushing them aside. As a result, the roller 42 does not contact the conductive pad 15. In this embodiment, the organizer 100 starts the scanning mode when the two parts, roller 42 and conductive pad 15, become electrically disconnected. The detailed detecting method will now be explained.

Figure 2:
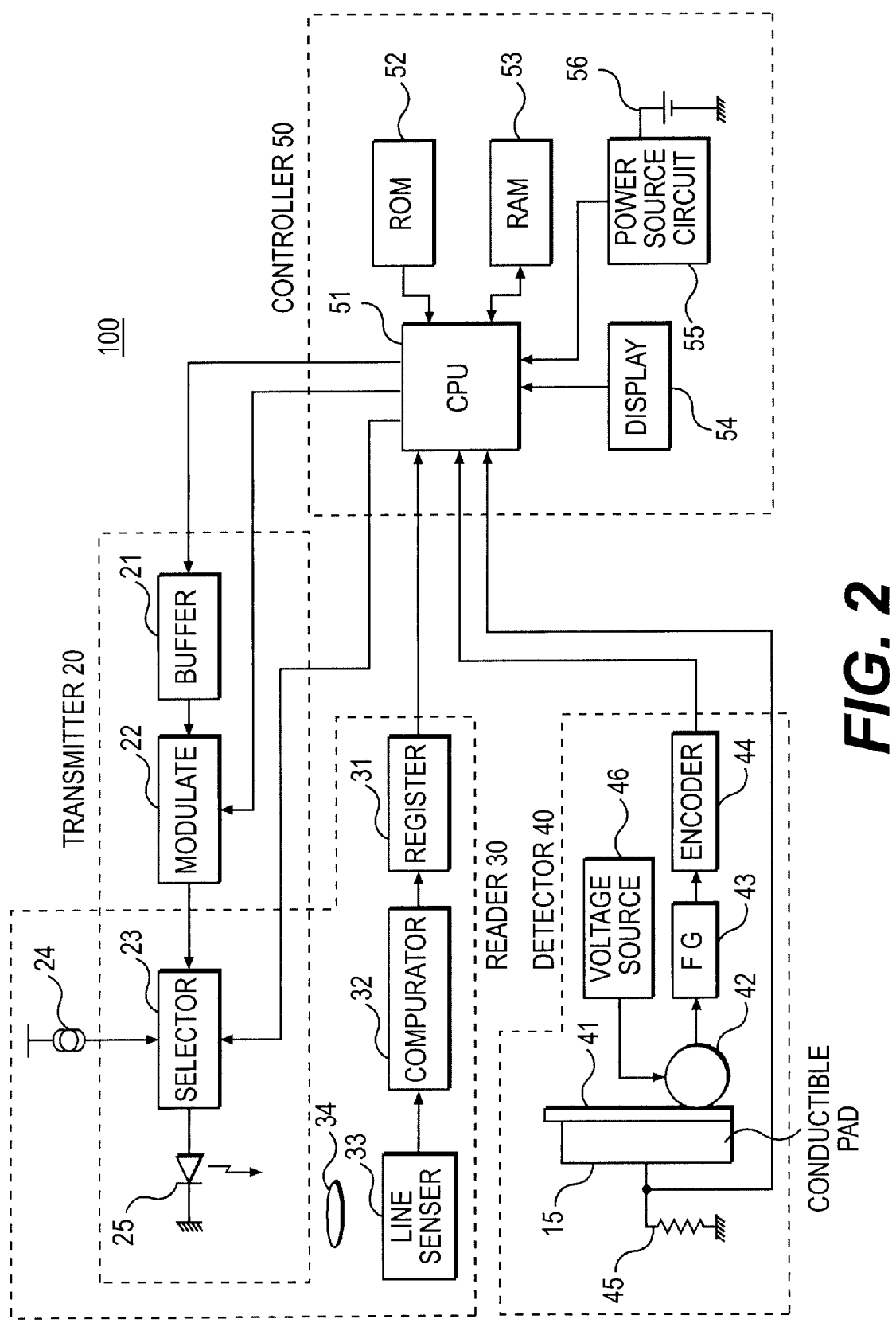
FIG. 2 is a block diagram of the embodiment of FIGS. 1A and 1B.

FIG. 2 shows a block diagram of the organizer 100. The organizer 100 of this invention comprises a transmitter 20 that transmits stored data in the organizer 100 to external equipment such as a PC, a reader 30 that scans an image 41 and generates data corresponding to the scanned image; a detector 40 that detects insertion of the image 41 into the organizer 100 through the opening 12 and detects the amount of movement of the image 41 along the inserting direction; and a controller 50 that processes data from both the reader 30 and the detector 40.

The transmitter 20 includes a light source 25, a buffer 21, a modulator 22, and a selector 23. The buffer 21 temporarily stores data output from the controller 50. The modulator 22 creates a PSK (Phase Shift Keying) signal based on the data stored in the buffer 21. When the selector 23 selects the modulated signal (Data Transmission Mode), the modulated signal is provided to the light source 25, and the light source 25 emits light according to the modulated signal. That is, light output from the organizer 100 varies according to the stored digital data in the buffer 21.

The reader 30 includes a current source 24, a condensing lens 34, a line sensor 33, a comparator 32, and a register 31. The current source 24 supplies a constant amount of current to the selector 23. When the selector selects the constant amount of current from the current source 24 (Scanning Mode), the light source 25 emits a constant amount of light. The light emitted from the light source 25 is reflected on the image 41 and concentrated on the line sensor 33 by the condensing lens 34. The line sensor 33 receives the reflected light and converts it into an electrical signal corresponding to the intensity of the received light. Then, the electrical signal enters the comparator 32 to compare the input signal with a reference level. The comparison result is output as digital data (for example, a 0 or 1). Thus, the digital data expresses or represents lightness or darkness of sampled portions of the image 41. The register 31 stores the digital data output from the comparator 32. Finally, the digital data is output to the controller 50.

The detector 40 includes the roller 42; the conductive pad 15 an F.G. 43 (a frequency generator); an encoder 44; and a resistor 45. The roller 42 is pushed toward the conductive pad 15 to hold the image 41. The frequency generator 43 generates a pulse-shaped signal that corresponds to rotational movement of the roller 42 so that the encoder 44 can calculate the progress of the image 41 by counting the pulse signal. The resistor 45 maintains a ground level voltage on the conductive pad 15 when the conductive pad 15 does not touch the roller 42. Moreover, a specific voltage is supplied to the roller 42 by a voltage source 46.

When both the roller 42 and the conductive pad 15 are touching together, the voltage source, the roller 42, the conductive pad 15, and the resistor 45 form an electric circuit. Therefore, the conductive pad 15 has a specific voltage because current flows in the electric circuit. However, when the roller 42 and the conductive pad 15 are disconnected by the image 41 being inserted between them, the electric circuit is opened. Thus, the voltage of the conductive pad 15 changes from the specific level to the ground level. The controller 50 detects the voltage variations on the conductive pad 15 to determine whether or not the image 41 is inserted through the slit 12 into the organizer 100.

Furthermore, the controller 50 includes CPU 51; ROM (Read Only Memory) 52; RAM (Random-Access Memory) 53; a display 54; a power source circuit 55; and a battery 56. The RAM 53, which is a re-writable memory, stores data such as text data input to the organizer 100 either manually or optically. Some stored data is suitably read and transferred to the buffer 21 to be transmitted to the other equipments. In addition, the RAM 53 can store image data input from the reader 30 and can store variables and counter values generated by processes of a program for operation of the organizer 100.

In advance, the ROM 52 stores program and dictionary information for OCR (Optical Character Recognition) for the Scanning Mode. The CPU 51 control all parts of the organizer 100 according to the program stored in the ROM 52. The program includes the Data Transmission Mode and Scanning Mode. Detailed explanations of both modes will be described later.

One of the roles of the CPU 51 is power supply control. The CPU 51 detects a voltage of the battery 56 connected to the power source circuit 55. When the voltage of the battery is lower than a specific level, the CPU 51 controls the display 54 so that a warning is shown on the display 54 and a warning sound is generated through a speaker (not shown). Furthermore, when the organizer is not used over a specific time, all parts (except the CPU 51, the RAM 53, and the roller 42) are automatically shut off. When a user operates a key (not shown) or the image 41 is inserted into the slit 12, the CPU 51 restores power to all parts of the organizer 100 from the power source circuit 55.

Next, the Data Transmission Mode and the Scanning Mode processed by the organizer 100 will be explained with reference to FIGS. 3 and 4. The flowcharts of FIGS. 3 and 4 are pre-programmed into the ROM 52 as the operational program.

Data Transmission Mode

Figure 3:
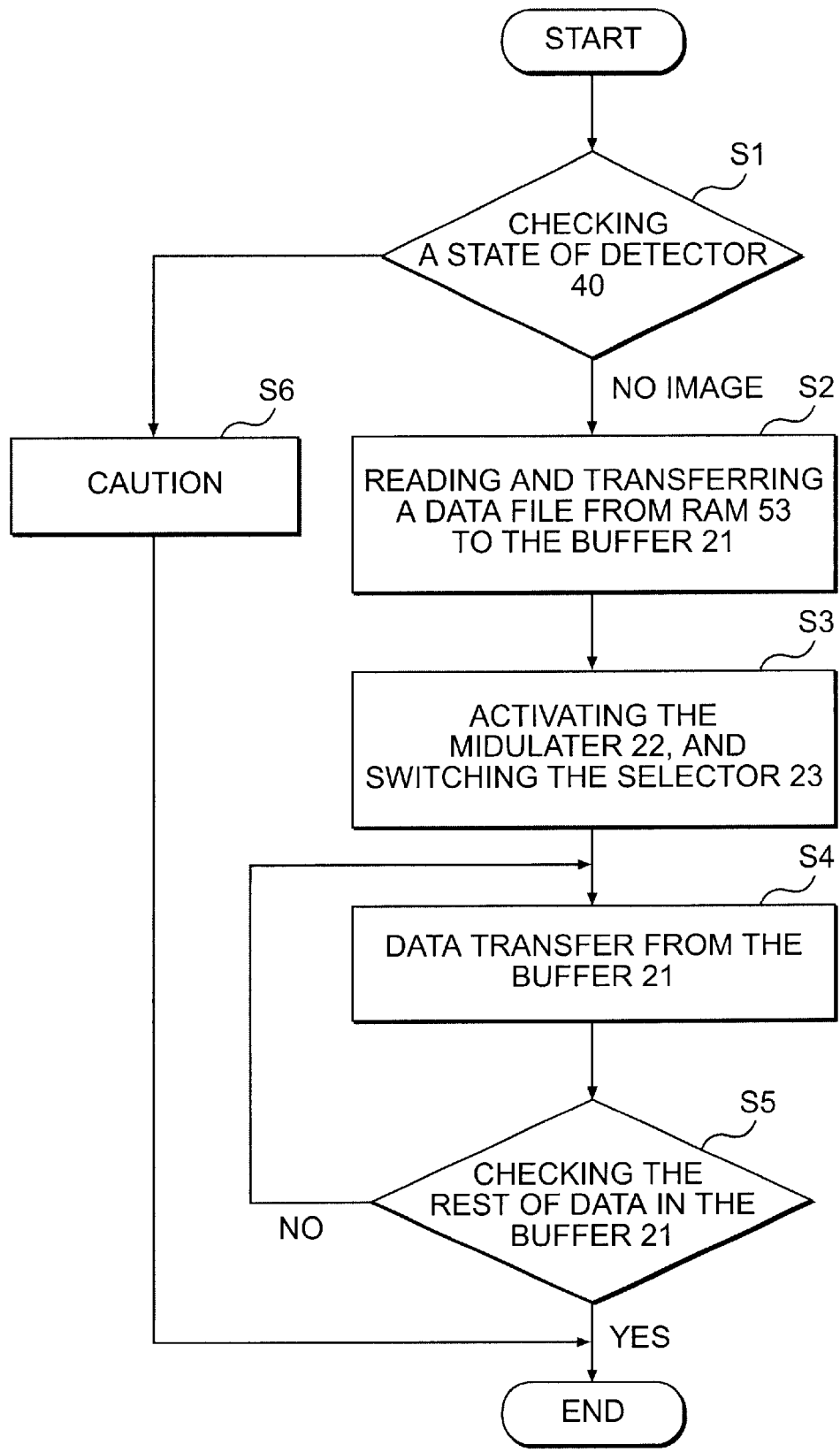
FIG. 3 is a flowchart showing the processes of a data transmitting mode according to the present invention.
Figure 4:
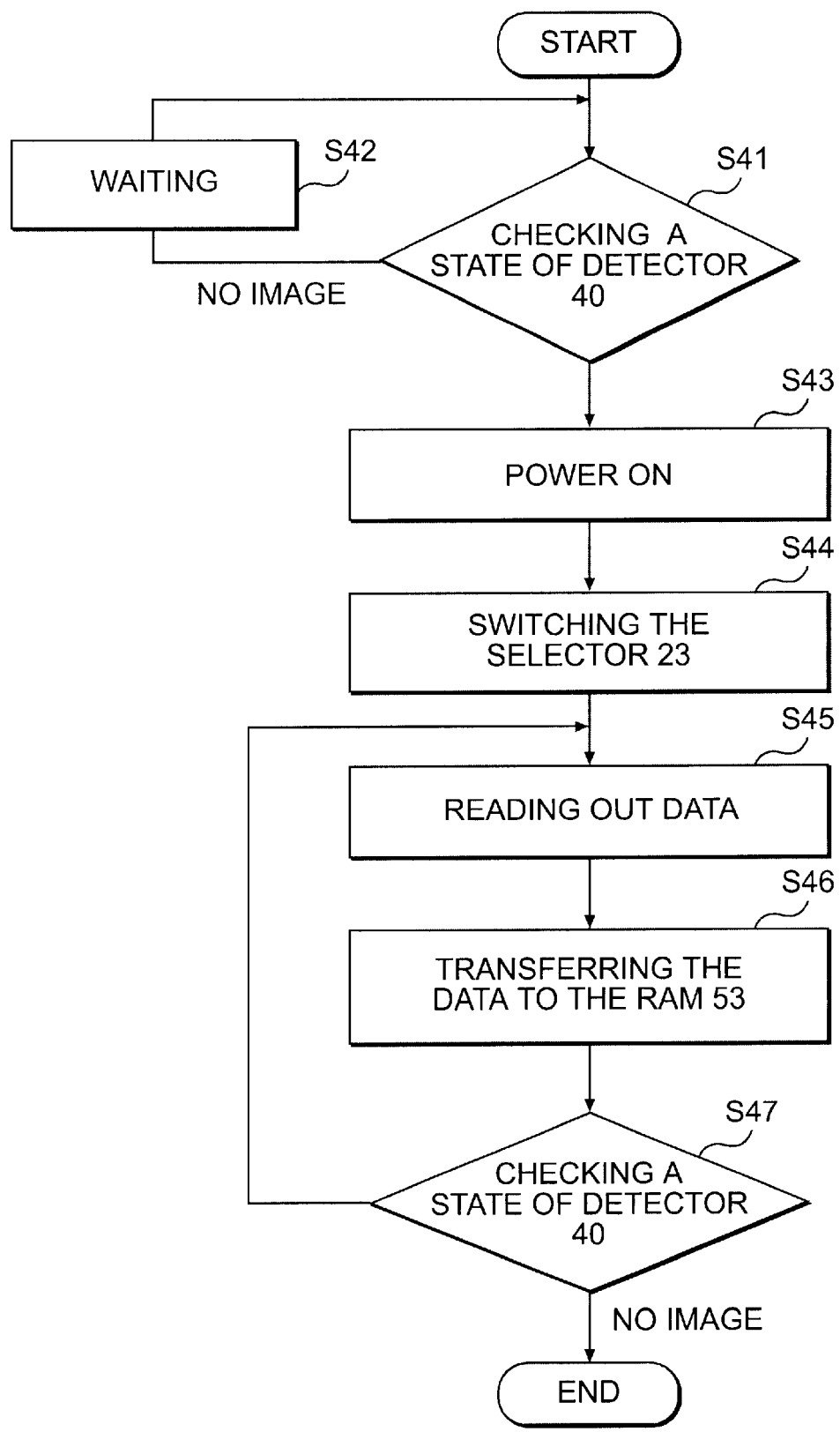
FIG. 4 is a flowchart showing the processes of a scanning mode according to the present invention.

FIG. 3 shows the flowchart of the Data Transmission Mode for sending stored data from the RAM 53 to an external device. In an exemplary situation, the power source circuit 55 of the organizer 100 may be activated by pushing a key, and data to be transmitted is already selected by the user before the Data Transmission Mode is activated.

Referring to FIG. 3, when the CPU 51 detects that the transmission button was operated by the user, the CPU 51 checks a state of the detector 40 (Step 1). When the detector 40 detects that the conductive pad 13 is separated from the roller 42 (Step 1, Yes) because an image 41 is being held by the two parts, the CPU 51 controls the display 11 to show a caution (Step 6), thereby indicating that the image 41 is obstructing data transmission. Then, the CPU 51 ends the Data Transmission Mode. In contrast, when the detector 40 detects that the conductive pad 13 and the roller 42 are touching (Step 1, No) because the image 41 is not inserted into the organizer 100, the CPU 51 proceeds to Step 2.

In Step 2, the CPU 51 reads and transfers the data file selected by the user from the RAM 53 to the buffer 21. Then, the CPU 51 activates the modulator 22 and switches the selector 23 so that an output signal from the modulator 23 is supplied to the light source 25 (Step 3).

Then, in Step 4, the CPU 51 controls the buffer 22 so that the data file stored in the buffer 21 is transferred to the modulator 22. The modulator 22 modulates the data file and creates a modulated signal, such as a PSK (Phase Shift Keying) signal. The modulated signal is supplied to the light source 25 via the selector 23. Therefore, the light source 25 emits modulated light according to the modulated signal inputted from the modulator 22. That is, the quantity of light emitted from the light source 25 is varied according to the modulated signal.

Next, the CPU 51 checks the remainder of the data in the buffer 21. When data still remains in the buffer 21 (Step 5, No), the CPU 51 returns to Step 4 to continue data transmission. In contrast, when no data remains in the buffer 21 (Step 5, Yes), the CPU 51 ends the Data Transmission Mode.

Scanning Mode

FIG. 4 shows a flowchart of the Scanning Mode used for scanning the image 41. Referring to Step 41, the CPU 51 checks whether the detector 40 detects the image 41. Here, the detector 41 checks the previously described voltage variation. When the CPU 51 detects the image 41 is inserted to the organizer 100 (Step 41, Yes), the CPU proceeds to Step 43. In Step 43, the CPU 51 turns the power source circuit 55 on. That is, the CPU 51 restores power from the power source circuit 55 to all components of the organizer 100. In contrast, when the CPU 51 detects that nothing has been inserted into the organizer 100 (Step 41, No), the CPU 51 repeats Step 41 after a specific waiting period (Step 42).

After Step 43, the CPU controls the selector 23 (Step 44) so that a constant amount of current from the current source 24 is supplied to the light source 25. Thus, the light source 25 emits a constant amount of light. Then, the CPU 5S reads data stored in the resister 31 to synchronize to the rotational movement of the roller 42 (Step 45). The rotational movement is calculated by the encoder 44 as described above. Then, the CPU 51 proceeds to Step 46 so that data read out from the resister 31 is transferred to the RAM 53 and stored in it. If necessary, the CPU can convert and store the data into character code.

Next, the CPU 51 checks if the detector still detects the image 41. When the detector 41 does not detect the image 41 (Step 47, Yes), the image 41 has completely passed the roller 42, and the CPU 51 ends the Scanning Mode. That is, the CPU 51 detects the completion of readout processes (Steps 45 and 46) by monitoring the state of the detector 41. In contrast, while the detector 41 is detecting the image 41 (Step 47, No), the CPU 51 repeats the readout processes.

In this embodiment, a user manually inserts the image 41 into the opening. It is also possible that the roller 42 automatically rotates after the detector 41 detects the image 41. Here, a driver drives the roller 41, and the CPU 51 controls the driver based on a detection signal from the detector 40.

Moreover, the filter 14, the conductive pad 15, the slit 12, the resister 45 are not necessary in view of the scope of this invention. That is, instead of insertion of the image 41, it is possible a user touches the image 41 to the transparent glass 16 disposed on the sidewall 10b, then the user moves the organizer 100 to scan the image. For instance, if the image 41 is on a desk, the image 41 is held between the roller 42 and the desk. Thus, the desk plays a role similar to that of the conductive pad 15 in holding the image 41 against the roller 42. By counting the pulse signal from the roller 42 that projects from the sidewall 10b, the organizer 100 can properly scan the image 41.

As described above, the present invention provide an efficient scanner within a portable electronic apparatus having a common fight source for data transmission and scanning.

It will be apparent to those skilled in the art that various modifications and variations can be made in the portable apparatus of the present invention without departing from the spirit or scope of the invention. Thus, it is intended that the present invention covers the modifications and variations of this invention, provided they come within the scope of the appended claims and their equivalents.

What is claimed is:

1. A portable electronic apparatus, comprising:

a light source;

a memory circuitry that stores data;

an optical scanning circuitry that uses the light source to optically scan an image supported by a pad and a roller which are electrically conductive and establish an electrical connection when the pad and the roller are in contact with each other, and to generate data corresponding to the image to be stored in the memory circuitry;

an optical transmitter using the light source to optically transmit data in the memory circuitry;

a selector to provide one of a first input signal modulated according to the data stored in the memory circuitry and a second input signal that is constant; and a controller that controls the selector to supply the second input signal to the light source when a scanning mode is selected and to supply the first input signal to the light source when a data transmission mode is selected, wherein the optical scanning circuitry further comprises a detector to detect whether or not the image is received based on an electrical disconnection between the pad and the roller.

2. The portable electronic apparatus according to claim 1, wherein the selector provides the second input signal when the detector detects the image.

3. The portable electronic apparatus according to claim 1, wherein the controller disables the first input signal when the detector detects the image.

4. The portable electronic apparatus according to claim 1, further comprising a detector to detect whether the image is received, wherein the controller outputs a warning if the detector detects the image during the data transmission mode.

5. The portable electronic apparatus according to claim 1, further comprising a power source connected with the roller, wherein the detector measures a voltage of the pad to detect whether the pad and the roller are electrically contacted.

6. The portable electronic apparatus according to claim 1, further comprising a window configured such that the image is disposed adjacent the window during the scanning mode and such that light from the fight sources modulated by the first signal is transmitted through the window during the data transmission mode.

7. The portable electronic apparatus according to claim 1, wherein the controller controls the selector based on an output from the detector.

8. A portable electronic apparatus, comprising:

a light source;

a memory storing data;

a scanner scanning an image by using the light source and comprising a pad and a roller, which are electrically conductive and establish an electrical connection when the pad and the roller are in contact with each other;

a selector selecting a scan mode with the scanner and a data transmission mode which transmit the data to an external device; and a controller controlling the selector based on a detection of an electrical connection between the pad and the roller, wherein the controller controls the light source to emit a constant amount of light at the scan mode and to emit a modulated light by the data at the data transmission mode.

9. A portable electronic apparatus, comprising:

a light source;

a memory storing data;

a scanner scanning an image by using the light source and comprising a pad and a roller, which are electrically conductive and establish an electrical connection when the pad and the roller are in contact with each other;

a selector selecting a scan mode with the scanner and a data transmission mode which transmit the data to an external device; and a controller controlling the selector based on a detection of an electrical connection between the pad and the roller, wherein the controller controls the selector to select the scan mode when the controller detects an electrical disconnection between the pad and the roller by inserting the image.

* * * * *